United States Patent
Jarrett et al.

(10) Patent No.: US 7,756,623 B2
(45) Date of Patent: Jul. 13, 2010

(54) SETTINGS CONTROL OF AN AGRICULTURAL VEHICLE

(75) Inventors: Tim Jarrett, Colchester (GB); Roberta Rossi, Modena (IT); Jim Holmes, Bury St. Edmunds (GB)

(73) Assignee: CNH America LLC, New Holland, PA (US)

( * ) Notice: Subject to any disclaimer, the term of this patent is extended or adjusted under 35 U.S.C. 154(b) by 1114 days.

(21) Appl. No.: 11/406,759

(22) Filed: Apr. 19, 2006

(65) Prior Publication Data
US 2006/0241837 A1    Oct. 26, 2006

(30) Foreign Application Priority Data
Apr. 20, 2005    (GB) ................. 0507930.6

(51) Int. Cl.
*A01B 69/00* (2006.01)
(52) U.S. Cl. ............... 701/50; 701/36; 701/49; 56/10.2 R; 56/10.2 A
(58) Field of Classification Search ........ 701/36, 701/49, 50; 703/8; 172/2; 56/10.2 R, 10.2 A
See application file for complete search history.

(56) References Cited

U.S. PATENT DOCUMENTS

| | | | | |
|---|---|---|---|---|
| 5,897,600 | A | * | 4/1999 | Elmore et al. ............ 701/50 |
| 5,991,694 | A | * | 11/1999 | Gudat et al. ............ 702/2 |
| 6,119,442 | A | * | 9/2000 | Hale ............ 56/10.2 H |
| 6,122,580 | A | * | 9/2000 | Autermann ............ 701/49 |
| 6,123,155 | A | * | 9/2000 | Hollstein et al. ............ 172/2 |
| 6,144,910 | A | * | 11/2000 | Scarlett et al. ............ 701/50 |
| 7,006,914 | B1 | * | 2/2006 | Cahoon ............ 701/115 |
| 7,142,696 | B1 | * | 11/2006 | Engelsberg et al. ............ 382/118 |
| 2001/0001844 | A1 | | 5/2001 | Moore |
| 2002/0083695 | A1 | | 7/2002 | Behnke |
| 2002/0135470 | A1 | * | 9/2002 | Campagna ............ 340/436 |
| 2004/0006957 | A1 | * | 1/2004 | David Sheidler et al. . 56/10.2 G |
| 2005/0055147 | A1 | | 3/2005 | Hrazdera |

FOREIGN PATENT DOCUMENTS

WO    WO 01/32472    *    5/2001

* cited by examiner

*Primary Examiner*—Khoi Tran
*Assistant Examiner*—Spencer Patton
(74) *Attorney, Agent, or Firm*—Patrick M. Sheldrake; John William Stader; Michael G. Harms

(57) ABSTRACT

An agricultural vehicle with a plurality of controlled implements, is provided with a programmable computer having input devices for receiving data and instructions from the vehicle operator and connected to send control signals to the implements, and a display screen connected to the computer to display information regarding the operation of the vehicle and the implements. The computer is programmed to enable the operator to record the prevailing values of the settings of the different implements in a memory.

6 Claims, 10 Drawing Sheets

SETTINGS CONTROL OF AN AGRICULTURAL VEHICLE

FIELD OF THE INVENTION

The present invention relates to the control of different implements by the operator of an agricultural vehicle. Though the invention may be applicable to combine harvesters and other agricultural machinery, its primary application is in tractors.

BACKGROUND OF THE INVENTION

The driver of a tractor needs to monitor and control a wide variety of parameters relating to both the operation of the tractor itself and the operation of an implement attached to the tractor.

To monitor the operation of the tractor, it is known to provide a cab display (CD) screen which is connected through a proprietary communications bus to a dedicated computer which receives signals from different sensors that are mounted on the tractor. The driver can select to display on the screen the information that is relevant to the operation being performed at the time. For example, if operating a plough, the driver may wish to monitor the operation of the three point hitch and, when operating such ancillary equipment as a mechanical shovel, he may wish to monitor the settings of the hydraulic circuits powering the equipment.

To monitor the operation of an implement coupled to the tractor, on the other hand, it is known to provide in the cab of the tractor a separate virtual terminal (VT) display which communicates with the implement using a bus complying with industry standard ISO 11783. Using an industry standard bus to establish communication between the VT display and the computer mounted on board the implement, allows the same display to be used with implements from different manufacturers.

Aside from the cost of providing two separate screens for the cab display and the virtual terminal, the prior art has the disadvantage of requiring the driver to gather information separately from two screens and to use different keypads or control panels to select the information and set the control parameters displayed on the different screens.

In a patent application filed on the same day as the present application, the Applicants have proposed an agricultural vehicle having a screen, a control panel associated with the screen and two data buses operating using different protocols connected in common to the screen and to the control panel to permit the screen to communicate with two computers mounted on board the vehicle and an implement connected to the vehicle, respectively, so as to allow the screen to display selectively data relating to both the vehicle and the implement.

By enabling a single screen mounted in the cab to act both as a CD and VT display, the invention allows the driver of an agricultural vehicle to monitor and set parameters in both the tractor and the implement without having to switch between screens and control panels.

While the latter proposal simplifies the monitoring of several operations, the need to be able to control different implements under different operating conditions still calls for a great deal of experience and skill.

SUMMARY OF THE INVENTION

The present invention seeks to assist the skilled vehicle operator in the task of optimizing the settings for the different implements under any given set of operating conditions and to offer assistance to the less skilled operator. In accordance with the present invention, there is provided an agricultural vehicle having a plurality of controlled implements, a programmable computer having input devices for receiving data and instructions from the vehicle operator and connected to send control signals to the implements, and a display screen connected to the computer to display information regarding the operation of the vehicle and the implements, wherein the computer is programmed to enable the operator to record the prevailing values of the settings of the different implements in a memory.

The invention thus provides within the context of an agricultural vehicle a computerized notebook in which an operator can record the performance achieved using different settings under different operating conditions. When operating for the first time under the prevailing conditions (which will depend on the crop, the weather and the soil conditions), the operator will use his own skill and knowledge (or pre-stored default values) to set the starting point for the different controlled implements. These values may then be tweaked to optimize the performance. Once such optimum values have been established empirically, the driver may then store the values in computer memory for future retrieval.

Preferably, the operator may also set the different implements automatically from values retrieved from the memory.

Advantageously, the memory has storage locations for default settings accessible by all operators in addition to notebooks accessible separately by the different operators.

The default settings may be permanently entered into the memory at manufacture. Alternatively, authorized operators may be allowed to overwrite the default settings. In this way, a less experienced operator nay be given the option to use settings optimized by a more experienced operator.

BRIEF DESCRIPTION OF THE DRAWINGS

The invention will now be described further, by way of example, with reference to the accompanying drawings, in which.

DETAILED DESCRIPTION OF THE EXEMPLARY EMBODIMENTS

Figure 1:
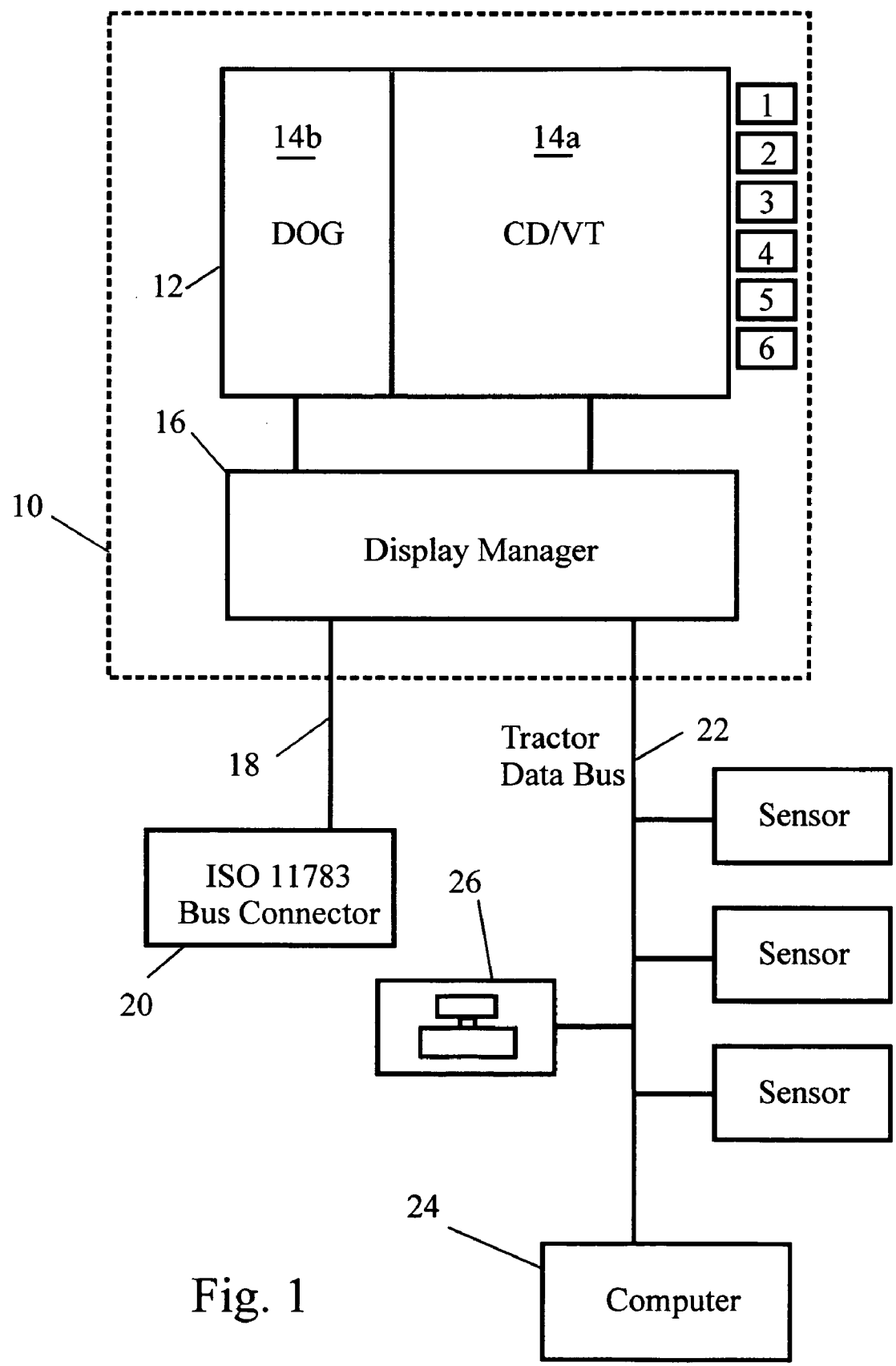
FIG. 1 is a block diagram of an information display system in an agricultural tractor.
Figure 2:
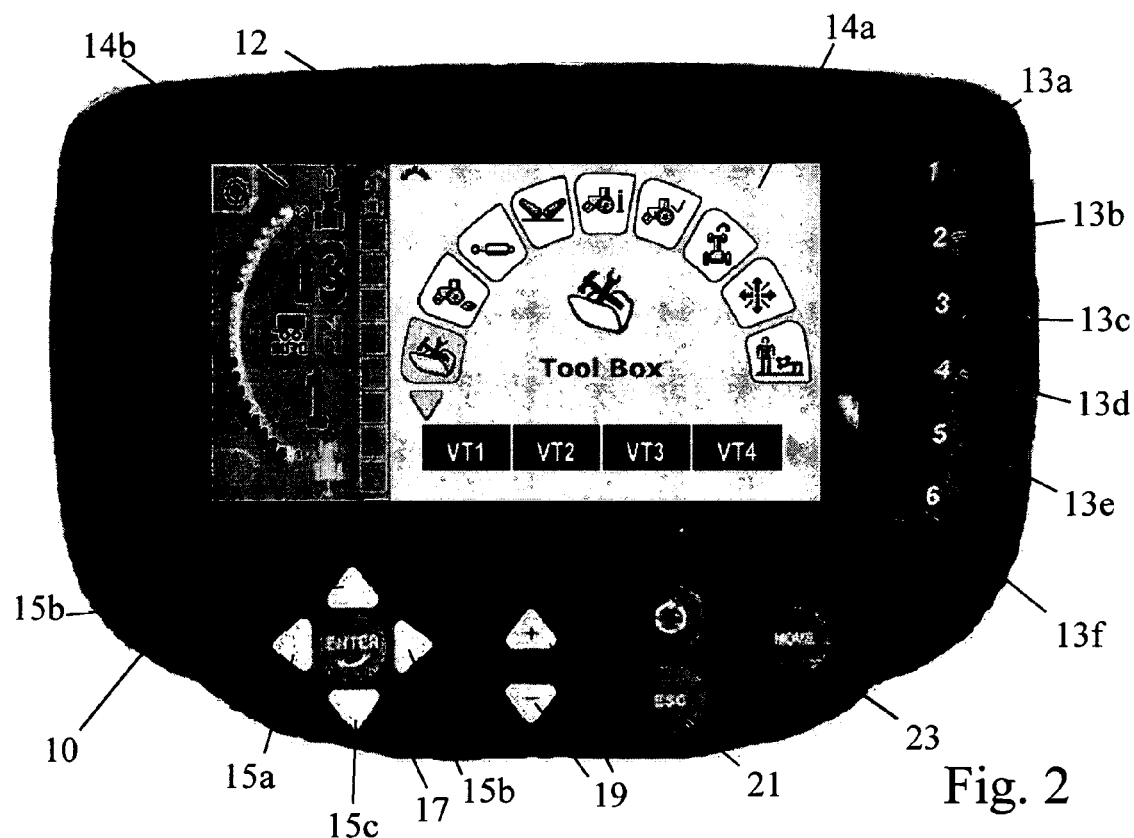
FIG. 2 is a front view of a display unit showing the display screen and various control buttons arranged on the panel surrounding the screen.

In FIG. 1, a small wide color display (SWCD) unit 10 incorporates a display screen 12 and a display manager 16. The outward appearance of the SWCD unit 10 is as shown in FIG. 2, where is it seen to comprise a set of buttons arranged in the bezel surrounding the screen 12. The layout of these buttons is generally standard. The six buttons 13a to 13f numbered 1 to 6 arranged to the right of the screen are so-called soft switches whose function changes constantly under program control. In use, a menu item displayed on the screen alongside the relevant soft switch can be selected by depressing that switch. The buttons along the bottom of the screen are navigation and value setting buttons. In particular, they comprise four screen navigation buttons 15a to 15d (that move a cursor or a highlight around the screen) surrounding an Enter button 17, two UP/DOWN value setting buttons 19, and two menu navigation buttons 21 and 23. The button 21 is an Escape key to return to the next higher menu in the menu hierarchy and the button 23 is a Home key that directly returns to the top menu.

The screen image is divided into two areas 14a and 14b. The area 14b is used as a conventional display of gears (DOG). This includes an icon indicating the direction of travel, and the currently selected gears in both directions. It will be appreciated that a tractor need not always be started in first gear and the display is used to indicate to the operator the gear that will be selected when the driver changes from forward to reverse drive. As best seen from the screen image of FIG. 3, the DOG also has two icons to indicate when the tractor is in automatic mode and in neutral. As the DOG is generally conventional, it is not necessary for it to be described in greater detail in the present context.

The remaining area of the screen image 14a is used in the present invention either as a cab display (CD) to display information relating to the operation of the tractor, as will be described in greater detail below, or as a virtual terminal (VT) for an item of ancillary equipment, such as a plough or a baler, that is hitched to the tractor. Hitherto, two separate display units were required, one to act as a CD and the other as a VT and, aside from the additional cost, this made it difficult and complicated for the driver, who had to keep his mind on two different screens each with its own set of controls. The illustrated embodiment of the present invention overcomes these disadvantages by providing a dual function unit that acts both as a CD and a VT.

Because items of ancillary equipment are not dedicated to any one tractor, their connection to a VT terminal has to conform to an industry standard if the terminal is to be operated with ancillary equipment made by different manufacturers. For this reason, VT terminals on tractors are normally designed to operate with an ISO 11783 bus 18 and a standard connector 20 is provided on the tractor for connecting the computer of the ancillary equipment. The tractor data bus 22 which is connected to the tractor computer 24 and the various sensors mounted on board the tractor need not, and usually does not, conform to ISO 11783. The CD is therefore designed to operate in conjunction with a different bus from the VT and it is the incompatibility between the buses 18 and 22 that necessitated a tractor conventionally to be equipped with two different display units.

The need for compatibility also places certain constraints on the design of a VT terminal as it must itself comply with industry standards that dictate the aspect ratio of the screen and stipulate that certain switches be present on the display unit. The illustrated display unit complies with all these standards for a VT while doubling as a CD.

In the illustrated embodiment, a display manager 16 connected to drive the screen 12 is connected to two buses and manages the data received over both buses under program control to display on the area 14a of the screen either the image which would normally be seen on a cab display or that which would normally be displayed on a virtual terminal.

Aside from the saving in hardware, this combination of the VT and CD in a single unit simplifies operation by allowing the driver using a single set of controls to switch between a CD and a VT without having to move his attention from one side of the cab to the other.

In the remaining figures of the accompanying drawings, the functionality provided by the cab display will be described in detail. These figures all show the screen images displayed only in the area 14a of the screen 12 under program control. Though there are controls around the bezel of the display unit, as described previously, the preferred embodiment of the invention provides the user with an additional and simpler input device 26 that can be used as an alternative to the various buttons on the bezel surrounding the screen 12. The input device 26 comprises an infinitely rotatable knob connected to a shaft encoder. Rotation of the knob in some situations can be used for cursor navigation in place of the left and right or up and down navigation buttons 15a to 15d. In other situations, rotation of the knob is programmed to be equivalent to operation of the value setting buttons 17. In addition, the rotatable knob can be depressed in a manner analogous to the clicking of a mouse button. Under software control, different actions can be allocated to depression of the knob, depending on the length of time that it is maintained in a depressed state. It is preferred for a short depression (a few milliseconds) to be equivalent to actuation of the Enter button 17 and for a prolonged depression (1-2 seconds) to be used in lieu of the Escape key 21 to exit from a menu to the preceding menu in the hierarchy. If desired, a further prolonged depression of the knob (5-10 seconds) may be interpreted as a depression of the home key 23, to return the program to the top level menu.

Hence, all the navigation and value settings can be carried out by the operator using an input device comprising a single axially depressible rotary button. The operator need not therefore remove his hand from the control knob of the input device 26 and as he does not have to look to see what button he is depressing, his attention is not called away from the windscreen and the display unit.

Figure 3:
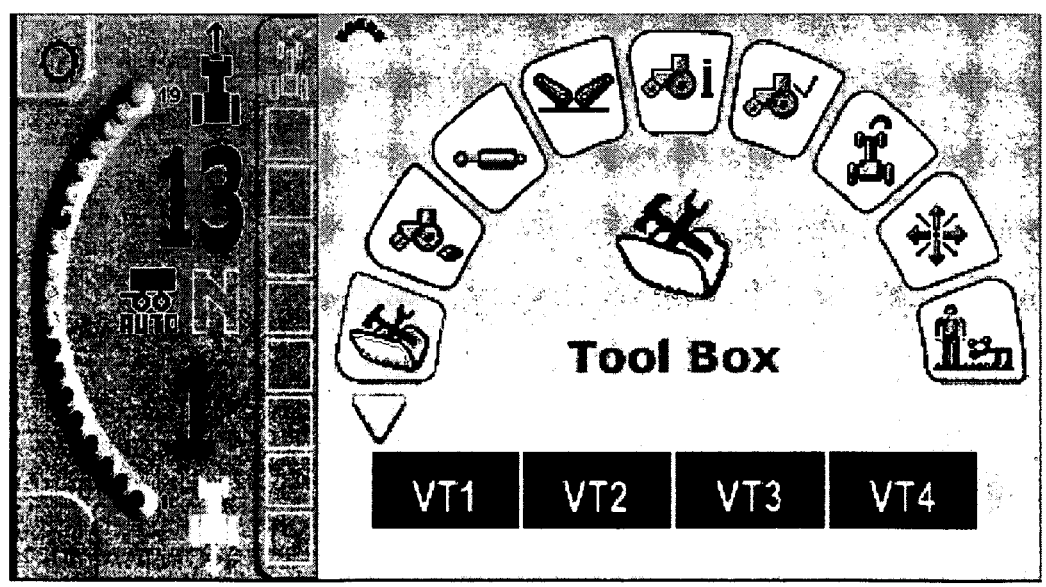
FIG. 3 shows the image only of the screen in FIG. 2, and FIGS. 4 to 59 show only the cab display part of the images displayed on the screen as a user navigates through the menu system
Figure 59:
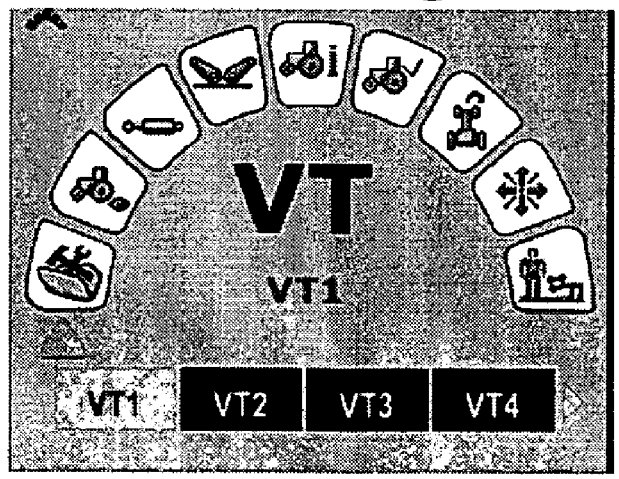

The screen images when the display unit is operating in the CD mode are shown in more detail in FIGS. 3 to 59. The program that is run by the computer 24 and which creates the various screen images shown in the drawings, is essentially a menu driven program with menus of different hierarchy analogous to an organization tree, with higher level menus displaying icons for the selection of lower level menus. The operator can use the input device 26 to navigate through all the various menus until reaching a particular parameter to be monitored, set or saved. Each screen is designed such that the cursor endlessly cycles from one selectable icon to the next as the rotary knob of the input device is turned clockwise and anti-clockwise. The cursor may be a pointer but it is simpler to show the position of the icon currently selected by highlighting it. This can be done in any suitable manner to distinguish the selected icon from the other available for selection.

The screen image shown in FIG. 3 is the top level menu which is also referred to herein as the Parliament menu (capital letters are used herein when referring the names or displayed titles of the menus) on account of its resemblance to the layout of the seats in some parliament buildings. Along the bottom of the screen there is a straight ribbon of icons labeled VT1, VT2 to VTN Only four such icons are visible on the screen at any one time but if the rotary knob of the input device is turned anticlockwise past VT4, the entire ribbon will move to the left to display icons VT2 to VT5 and VT5 will be selected. In this say, any number of VT's can be selected by turning the knob. Depression of the knob while a VT icon is highlighted will place the display unit under the control of the ancillary equipment connected to the terminal 20 whereupon the area 14b of the screen will continue to act as a DOG but the right hand side area 14a will act as a virtual terminal for the ancillary equipment.

By contrast, the icons arranged in the semi-circular arc are all concerned with the CD function of the display unit and these icons never move on the screen. When the knob of the input device is turned counter clockwise past the displayed Tool Box icon, the VT1 icon is highlighted and at the other end when the rotary knob is turned past the Profile icon, the VTN icon is highlighted. Thus the rotary knob allows the cursor to cycle seamlessly between the various CD functions, which are described further below, and the available VT terminals.

In the illustrated embodiment, the Parliament menu allows selection of nine different sub-menus associated with different aspects of tractor operation. FIGS. 3 to 11 show the effect on the screen of turning the rotary knob clockwise to select the different sub-menus that are available. As can be seen from these figures, when an icon is selected, not only does the icon become visually distinguishable from the others but also an enlarged image of the icon along with its function expressed in text is displayed in the centre of the screen. Icons are used in addition to the text to represent these various functions in order to make operation of the display as intuitive as possible to the tractor operator.

The nine different icons have the following functions, namely Tool Box, Performance, EHRs (AUX), Hitch Notebook, Trip Computer, Tractor Summary, HTS, Joystick and Profile. These will all be explained in further detail below.

Figure 12:
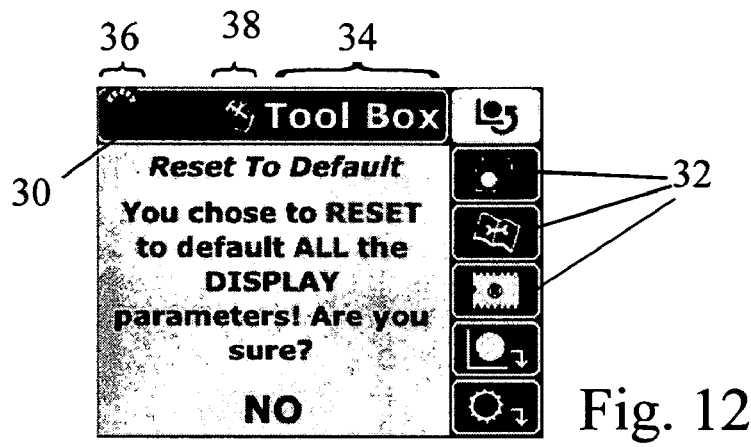

FIGS. 12 to 30 inclusive are all screens displaying menus and sub-menus of the Tool Box. FIG. 12 shows the first screen that is displayed when the Tool Box is selected from the Parliament menu. All menu screens apart from the Parliament menu have the same general layout. In particular, across the top of the screen a title bar 30 is displayed in which the selected sub-menu item is displayed in text alongside its icon. Down the right hand side of the screen there are selectable icons which can be chosen either by depressing the rotary knob of the input device 26 while they are highlighted or by pressing on the button 13a to 13f alongside the icon. The main body of the screen displays information to the operator to allow parameters to be set, monitored and saved.

At the left hand side of the title bar, there is displayed a set of icons showing graphically all the menus and sub-menus that have to be selected in sequence to arrive at the currently displayed screen. In the case of FIGS. 12 to 17 only one such icon is required, because the Tool Box is a sub-menu of the parliament menu but in the case of FIG. 18 two icons are needed because the Settings menu is itself an item selected from the Tool Box. These icons, also known as breadcrumbs, assist the operator by showing how the currently displayed menu can again be reached and which menu will be displayed if the Escape key is depressed to return to a higher level menu.

When the uppermost of the six selectable items displayed on the right hand side of the Tool Box menu is highlighted (see FIG. 12) the operator is given the option to reset all parameters to the default values, or factory settings. Within this screen rotation of the control knob of the input device 26 cycles through YES and NO and depression of the knob then determines whether or not the system is reset.

Figure 13:
Figure 14:
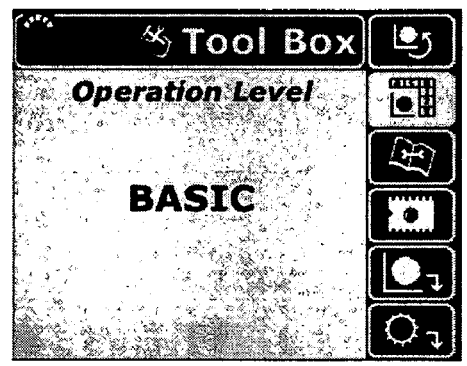

The next item selectable from the Tool Box allows the operator to set the operation level which, as shown in FIGS. 13 and 14 can be set to an Advanced or a Basic level by rotation followed by depression of the control knob.

Figure 15:
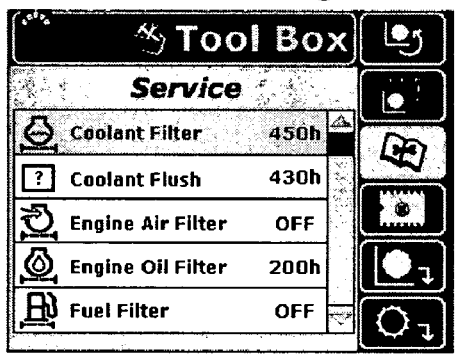
Figure 16:
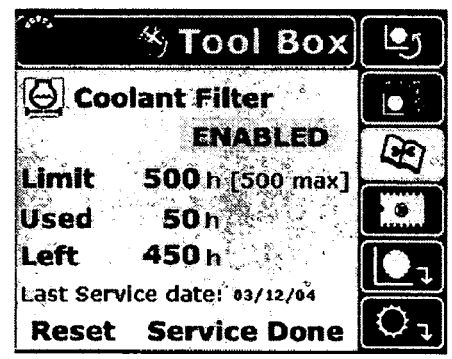
Figure 17:
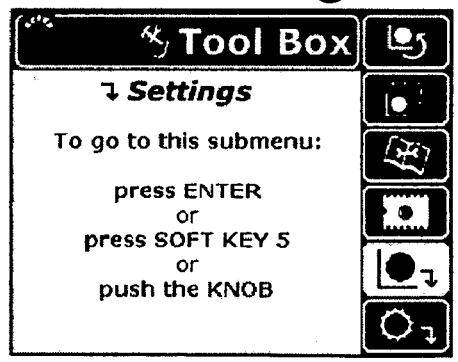
Figure 18:
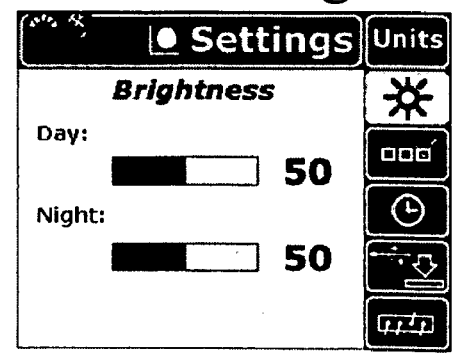
Figure 19:
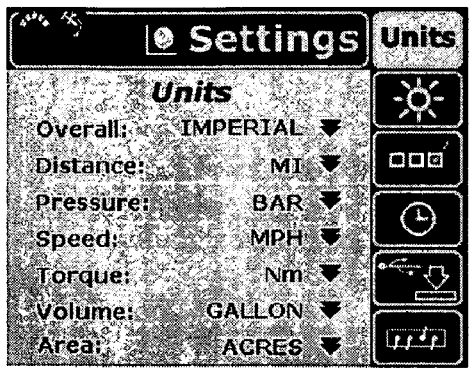
Figure 20:
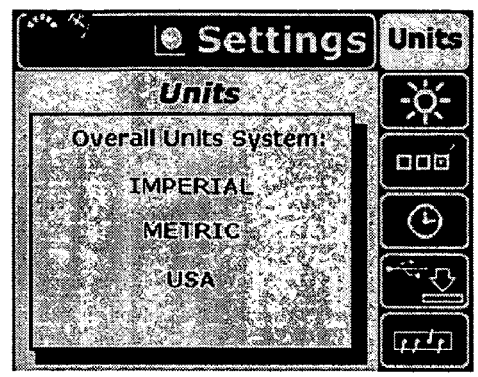
Figure 21:
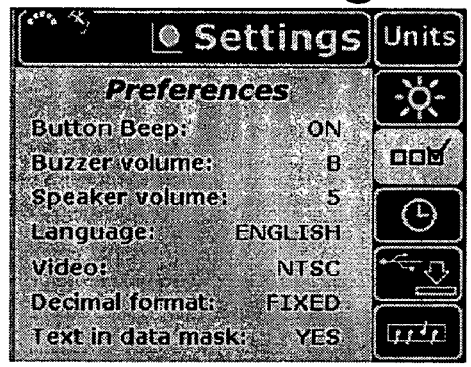
Figure 22:
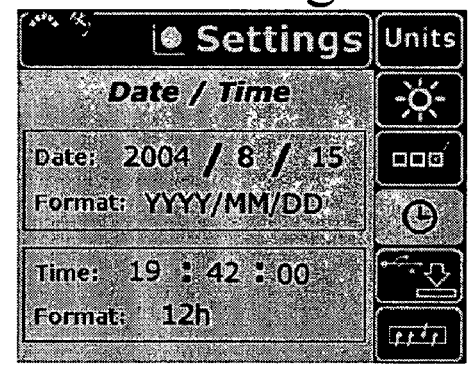
Figure 23:
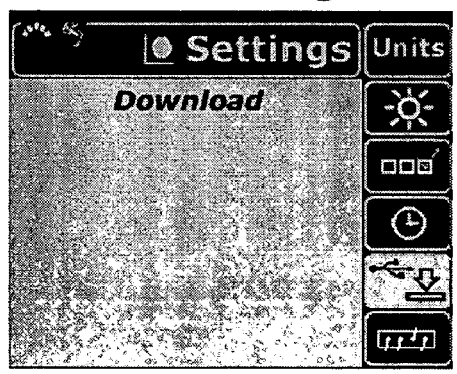
Figure 24:
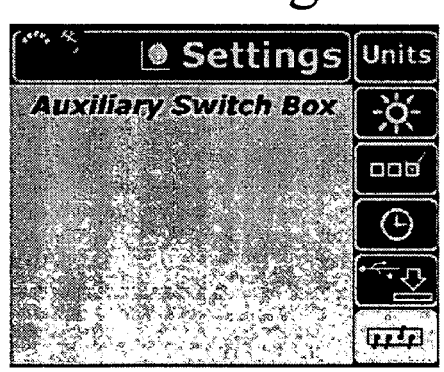
Figure 25:
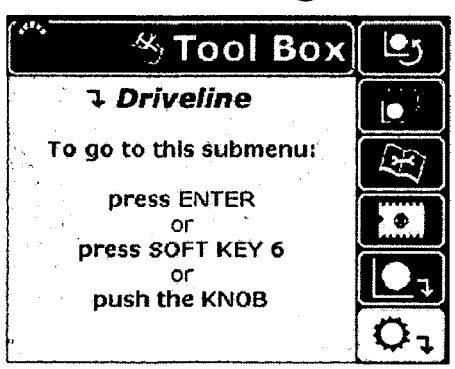

The third item in the Tool Box menu, shown in FIGS. 15 and 16 is a service menu which allows the user to monitor the condition of components such as the coolant, air, oil and fuel filters. For each component, as shown in FIG. 16, the user can Enable or Disable the monitor, set the length of the service interval and determine when next a service operation is required such as flushing the coolant or cleaning or replacing a filter.

The next item in the Tool Box is a Settings sub-menu and the various parameters that can be set are shown in FIGS. 18 to 24. These parameters should be self-evident from the drawings. The top item in this sub-menu (see FIGS. 19 and 20) allows the user to inspect or change the measurement units. Thus the user can select between IMPERIAL or METRIC units, so that distance can be displayed in miles or kilometers, pressure in bars, psi or kilopascals, speed in mph or kph, torque in nm of ft. pound, volume in gallons or liters and area in acres or hectares.

The next item in the Settings menu (see FIG. 18) allows the brightness of the display to be set. Different brightness levels can be set for day and night.

The third selectable item in the Settings menu (see FIG. 21) allows the user to set whether or not a beep is produced when a button is depressed, to adjust the volume of the buzzer and the speaker, to select the language of the display, to select the television standard and decimal format and to set a data mask when entering text.

The fourth item on the Settings menu (see FIG. 22) allows the operator to set the time and date and the last two items are to enable data and programs to be downloaded and to operate an auxiliary switch box.

Figure 26:
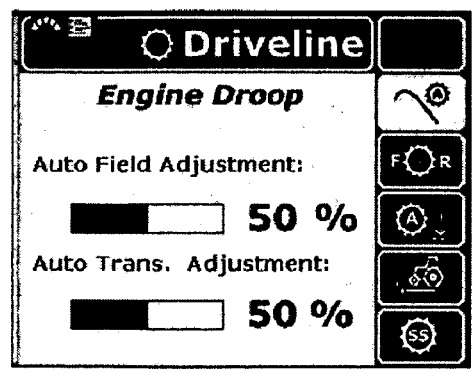
Figure 27:
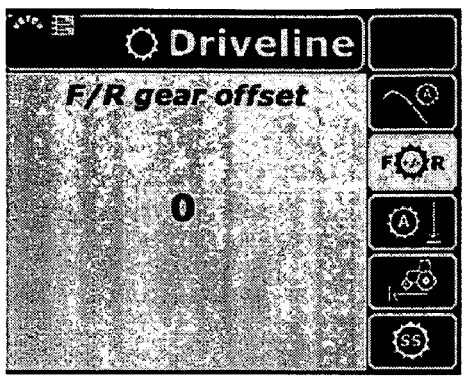
Figure 28:
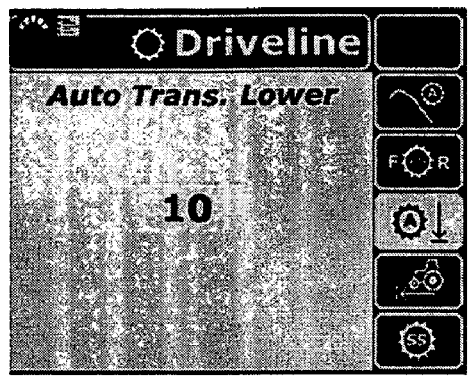
Figure 29:
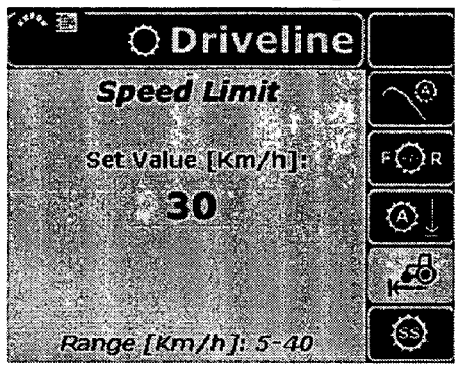
Figure 30:
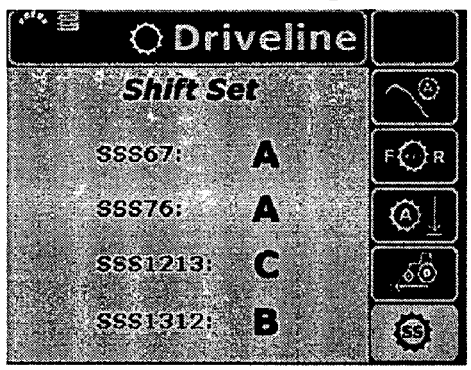
Figure 31:

The last of the items selectable from the Tool Box menu (see FIG. 25) is a Driveline menu which allows the operator to set various controls of the driveling The individual controls are shown in FIGS. 26 to 30, the first selectable item being the engine droop (see FIG. 26). This setting determines the rate at which the engine output torque changes with engine speed. If the droop is set too high then the engine will hunt and if it is set too low then the engine will not respond quickly.

The next item (see FIG. 27) in the Driveline menu is the forward/reverse speed offset. As earlier mentioned, a tractor is not always started in first gear and this setting determines the difference between the starting gears in forward and reverse. Thus the tractor may be set to start in fifth gear when moving forward but third gear when moving in reverse.

The third item in the Driveline menu (see FIG. 28) allows the user to set the lowermost gear selectable when operating in automatic transmission.

The fourth item in the Driveline menu (see FIG. 29) allows the user to set a maximum speed limit and the fifth (see FIG. 30) allows to user to set the harshness level (A B or C) during certain swap shifts, in particular between 6th and 7th gear and between the 12th and 13th gear.

Figure 4:
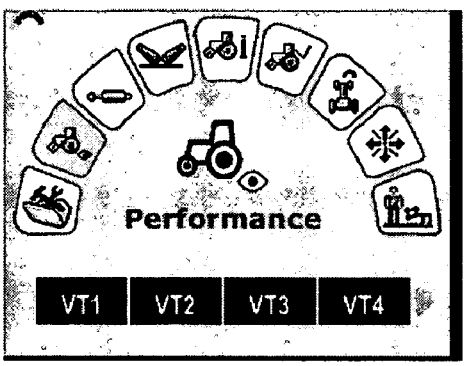
Figure 5:
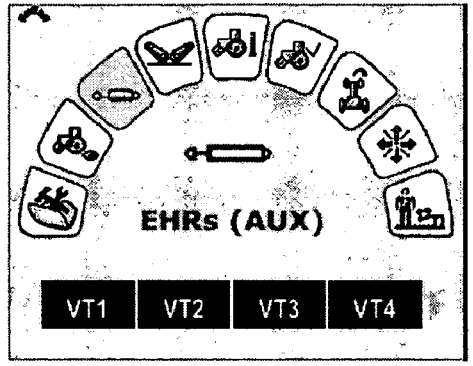

This completes the description of the Tool Box and the next item selectable from the Parliament menu is the Performance menu (see FIG. 4).

Figure 32:
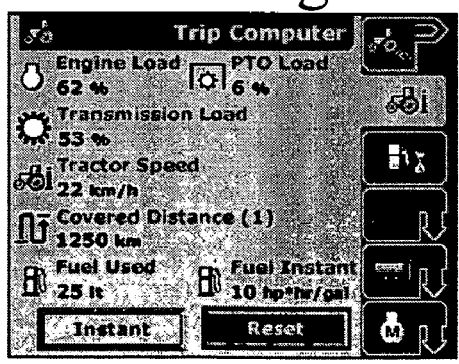

The top item in the Performance menu has an icon which includes a paper-clip like right pointing arrow. This is to indicate that this is a navigation short-cut to another screen of the menu system, the Trip Computer (FIG. 32) being a menu that can be reached directly from the Parliament menu (see FIG. 7). The Trip Computer functions will be described further below.

The second item of the Performance menu (FIG. 33) displays productivity. The screen displays the current and target values of certain parameters, such as area per hour or total field area covered and allows the user to change the target value for each of these parameters. The productivity screen also displays the remaining fuel range and the expected time to finish the set area.

Figure 33:
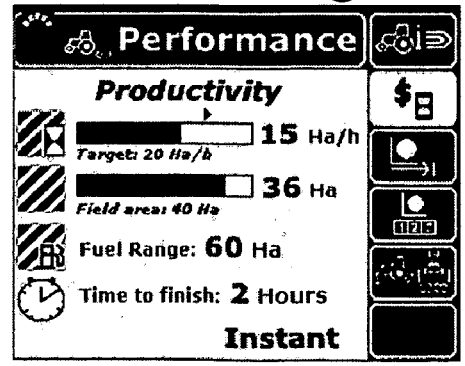
Figure 34:
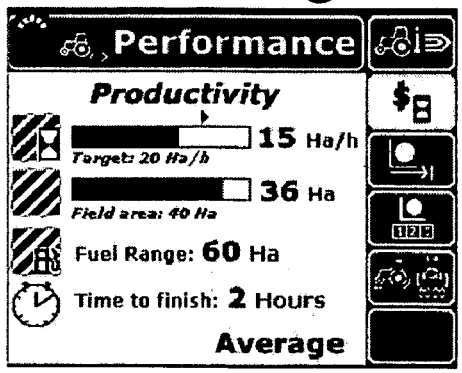

As seen by comparing FIGS. 33 and 34, the user can also switch between instant and average values of the different parameters.

Figure 35:
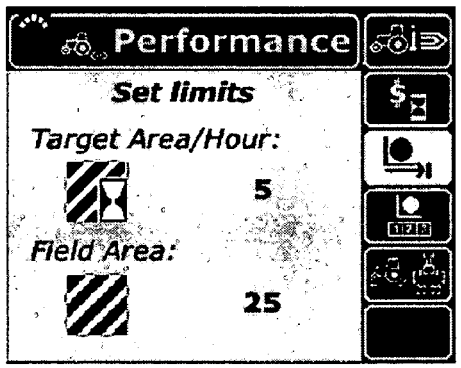

The target values can be set using the next item in the performance menu (see FIG. 35). As the user rotates the control knob of the input device 26, a different parameter is selected on the screen and to alter the target value, the parameter is selected by depressing the control knob. After selection has taken place, rotation of the control knob will change the target value.

Figure 36:
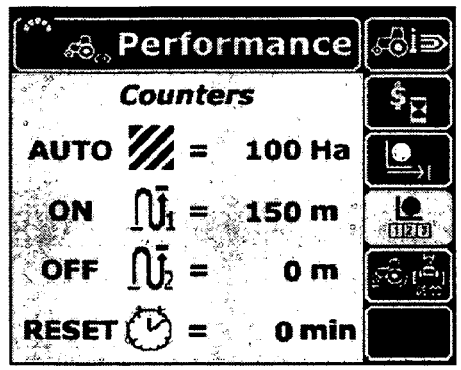
Figure 37:
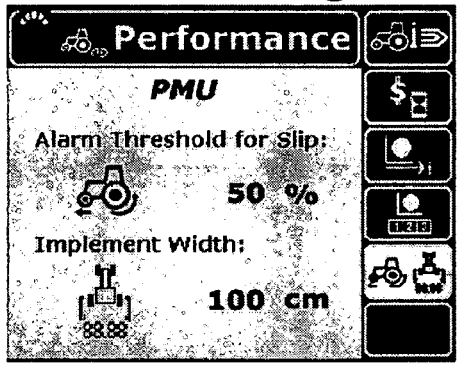

The fifth selectable item of the performance menu (see FIG. 36) displays different counters and the last item (see FIG. 37) allows the user to set an alarm threshold for slip and the implement width (required to calculate field area).

Figure 38:
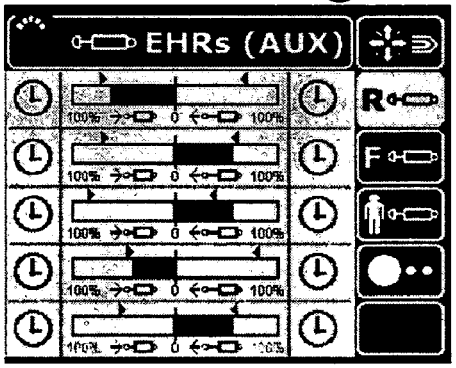
Figure 39:
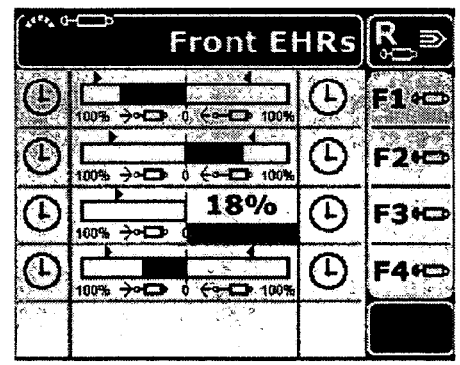
Figure 40:

Returning once again to the Parliament menu, it will be seen that the next selectable icon (FIG. 5) is concerned with the electro-hydraulic remotes (EHRs) and the menus accessible by selection of this icon are shown in FIGS. 38 and 39.

The top selectable icon in the EHRs menu is once again a short cut, as can be deduced from the paperclip shaped right pointing arrow in the icon. The short cut on this occasion is to the Joystick menu, itself selectable from the Parliament menu and described in greater detail below. The next two icons display the Front and Rear EHRs, respectively. Selection of any of these icons leads to a screen similar to that shown in FIG. 39.

Within each of the Front EHRs and Rear EHRs screen the top icon is a short cut to the other. For each of the individual front and rear hydraulic remotes F1 to F4 and R1 to R4, the operator can see the current rate of fluid flow to or from the hydraulic remote displayed as a bar or thermometer-like reading. Above the bar of each hydraulic remote, two small arrows indicate maximum level for rate of flow in each direction. These can be individually set in the menu of FIG. 39 in the same manner as described in relation to the Performance target settings.

The fourth selection available from the EHRs (AUX) menu is a user selection of the front and rear EHRs grouped together in one screen. This is to enable the operator to display only the EHRs that are of most interest to the task at hand.

The last selection from the EHRs (AUX) menu, represented by an icon comprising one large and two small circles, is used to set the EHR to be given the highest priority when there is not sufficient fluid to meet the demands of all the EHRs. The user can set the high priority EHR to be any one of R1 to R4 or F1 to F4, or else to NONE.

Figure 6:
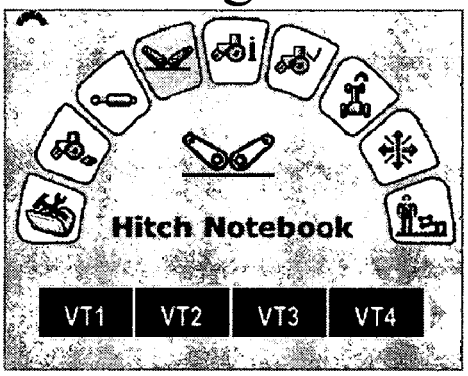
Figure 7:
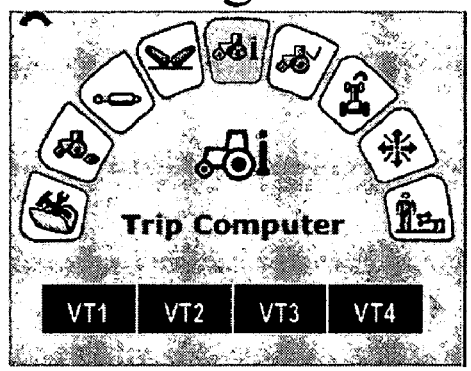
Figure 8:
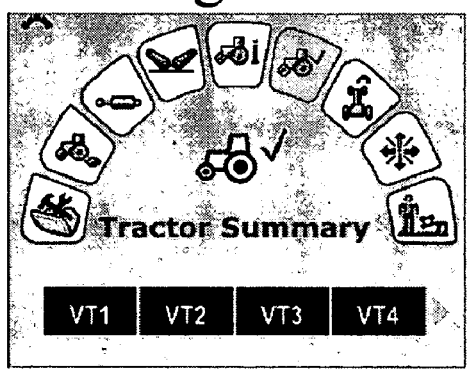
Figure 9:
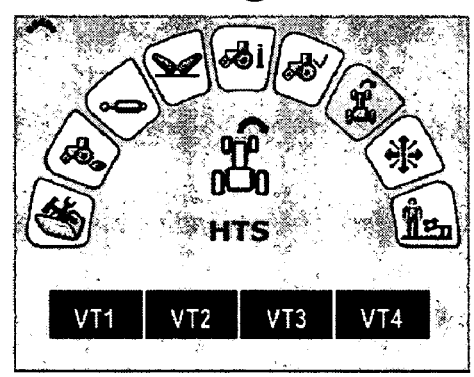
Figure 10:
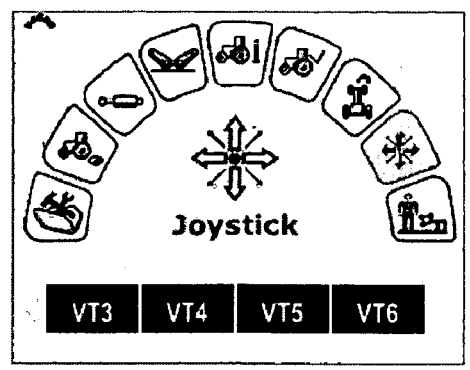
Figure 11:
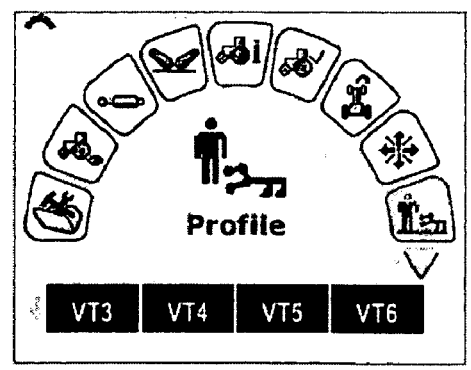

The next icon selectable from the Parliament menu is the Hitch Notebook (see FIG. 6). This is to allow the operator to save a record of the current settings being used for each of the front and rear hitches. The operator may also be given the option to use values stored in the notebook to set the front and rear hitches.

The set of menus accessible from the Hitch Notebook relating to the Rear Hitch are shown in FIGS. 40 to 43, a similar set being also available for the Front Hitch.

Figure 56:
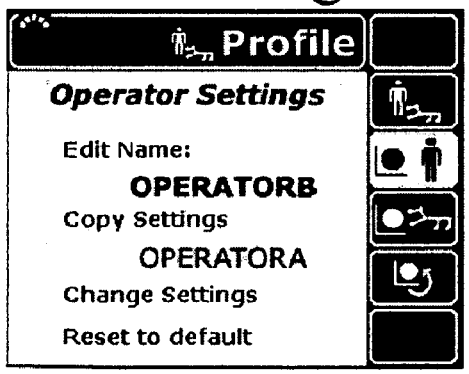
Figure 57:
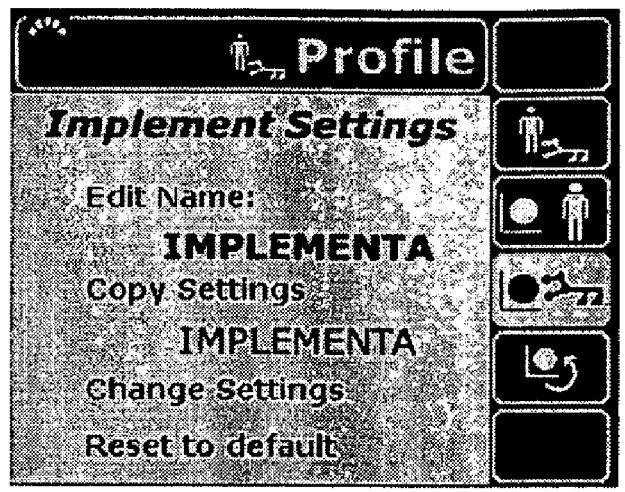
Figure 58:
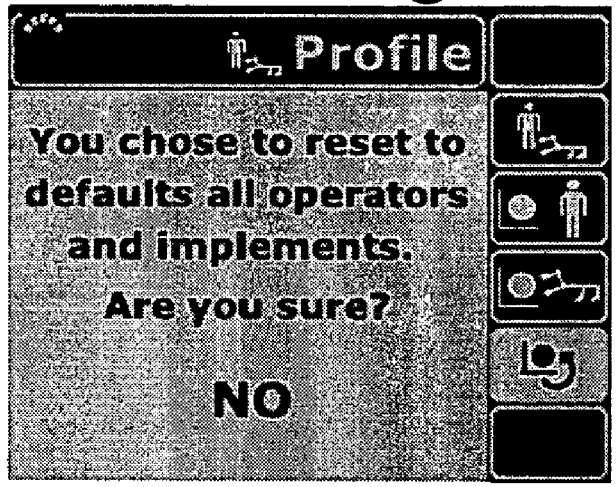

It will be noted that each notebook screen has as a heading OPERATORA, this being the name of the operator which is set using the Profile menu to be described below with reference to FIG. 56. Each operator has his own notebook and when adding a new operator settings can be copied from an existing operator.

Figure 41:
Figure 42:
Figure 43:
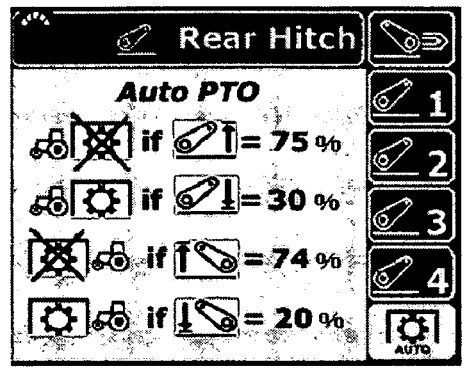

The first icon in each of the Front Hitch and Rear Hitch menus is a short cut to the other. All the remaining icons, when highlighted, display current values of parameters and targets associated with individual hitches, as shown in FIG. 41 along with a Save icon. The parameters displayed are draft control, sensitivity control, maximum and minimum hitch height and slip control. Selection of any one of the hitches by depression of the rotary knob of the input device 26 (or by depression of the Enter button 17) while its icon is highlighted will bring up the menu shown in FIG. 42 in which a further depression of the control knob is required to confirm the saving operation.

The last of the settings that can be modified in the Hitch Notebook are concerned with Auto PTO (see FIG. 43) which enable and disable front and rear power take off depending on the front and rear hitch heights.

The values stored in the notebooks may additionally indicate the prevailing operating conditions and the use of notebooks is of course not restricted to front and rear hitches but is applicable to any other implement use in an agricultural vehicle.

The Trip Computer icon of the Parliament menu (see FIG. 7) is used to access the screens shown in FIGS. 44 to 52 which provide information on the operation of the tractor. None of the Trip Computer screens can be used to enter data or settings into the computer, they are used purely to display data to the tractor operator.

Figure 44:
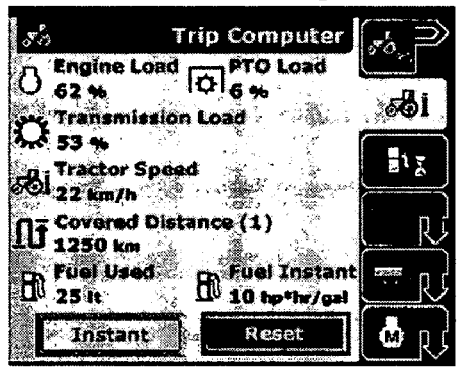

The first selectable icon is a short cut to the previously described Performance menu. The second icon, as shown in FIG. 44, displays the current engine load, PTO load, transmission load, tractor speed, covered distance, fuel used and current fuel usage rate.

Figure 45:
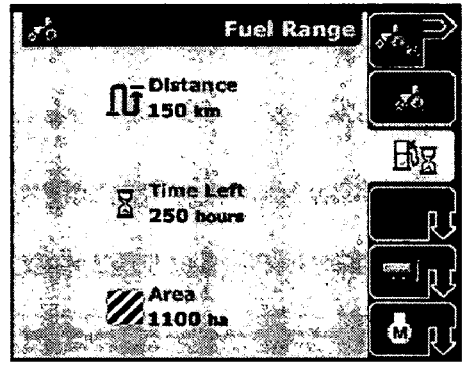
Figure 46:
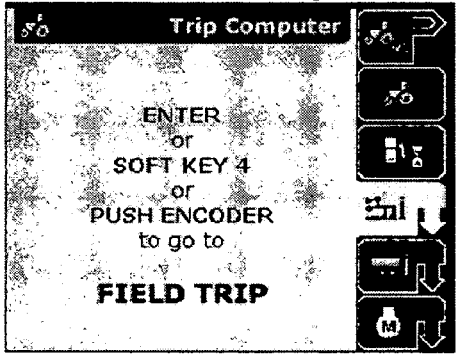
Figure 47:
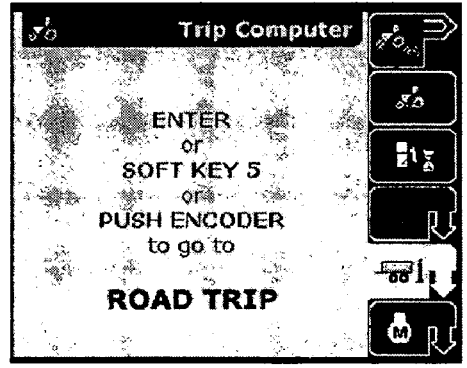
Figure 48:
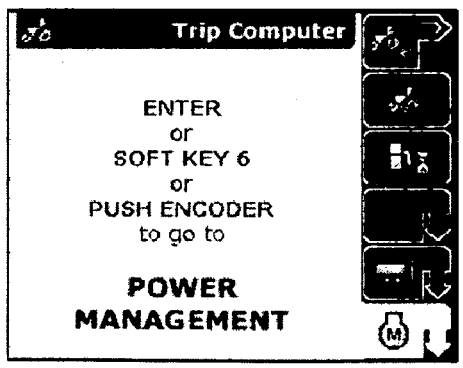
Figure 49:
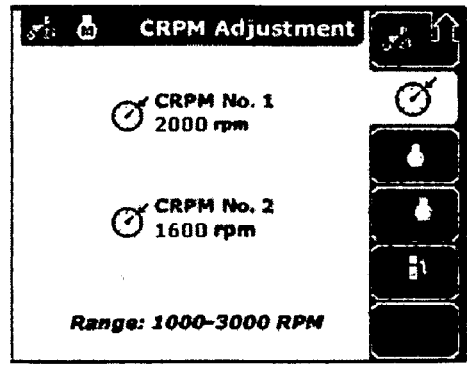

The next selectable icon, shown in FIG. 45, gives details of the fuel range, this being expressed in the number of miles, the number of hours and the area or land that can be covered with the remaining fuel.

The next two icons (FIGS. 46 and 47) displays information on the current field trip or road trip, as the case may be. Selection of one of these icons results in a display similar to that of FIG. 44 but showing data only for the current trip. The data may include such items as the most currently selected gear, area of ground covered, total fuel used etc.

Selection of the Power Management icon of the Trip Computer menu (see FIG. 48), allows the operator to select the screens shown in FIGS. 49 to 52.

Figure 51:
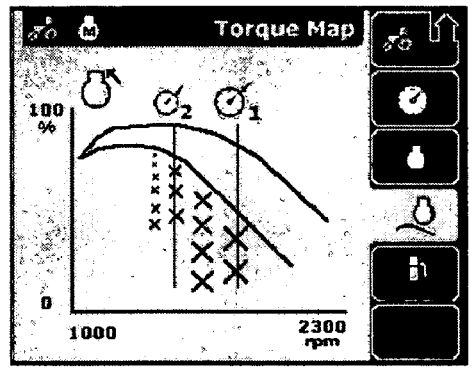
Figure 52:
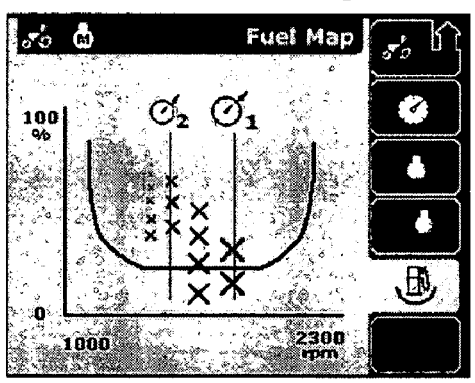

In the CRPM Adjustment screen, the operator can select the constant engine speeds that are displayed in FIGS. 51 and 52.

Figure 50:
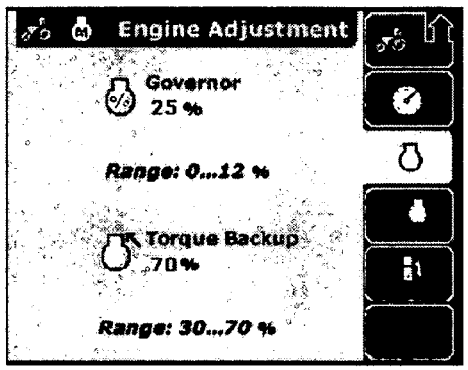

In the Engine Adjustment screen of FIG. 50, the operator can view the operation of the governor and the percentage of torque backup.

The Torque Map screen in FIG. 51 displays maps of boosted and unboosted output torque against engine speed. On the same map, two lines are drawn to represent the selected constant RPM's (refer to FIG. 49) and a set of crosses to indicate the point on the map at which the engine is operating. Also displayed are past operating points to provide a full history of the operation of the engine. Past operating points are represented by crosses that shrink, fade or change colour as they get older.

The Fuel Map of FIG. 52 is a similar display to FIG. 51 but this time showing the optimum fuel consumption at different engine speeds. This provides a visual indication to the operator of the current and past fuel efficiency of the engine.

Figure 53:
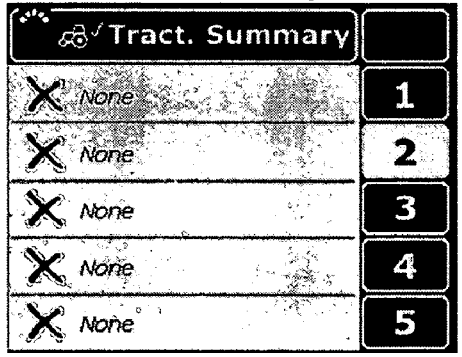

The Tractor Summary (see FIG. 53) allows the operator to customise the Cab Display by displaying on one screen the parameters that are most useful for the task in hand.

The HTS icon (FIG. 9) of the Parliament menu is concerned with head turning sequences. HTS control is well known in itself and is a complex system that need not be described in detail in the present context. When ploughing a field, a set of tasks needs to be carried out in sequence when reaching the end of a row. For example, gears need to be changed, the speed reduced and the plough raised before a turn is commenced. During the turn, it may be necessary to alter the orientation of the shares of the plough and after the turn, it is necessary to lower the plough, change gears and pick up speed. The purpose of HTS control is to automate these tasks by first learning as the tasks are performed by the operator and then repeating the tasks in the same sequence when the operator indicates that a turn is approaching. The CD display during this time will indicate all the tasks to be performed and will highlight the task being performed to allow the operator to monitor the progress of the turn sequence.

Figure 54:
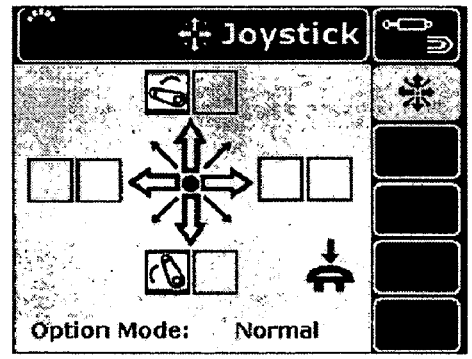
Figure 55:
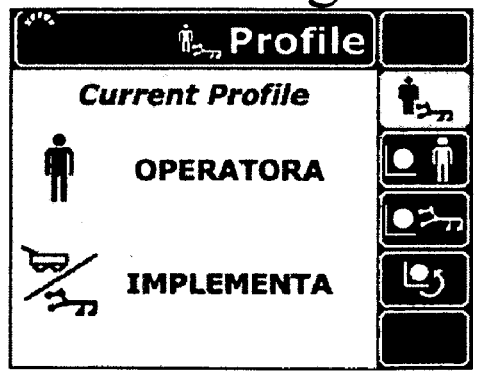

Selection of the Joystick icon of the Parliament menu (FIG. 10) displays the screen shown in FIG. 54. This allows the operator to assign different functions to the movement and actuation of the joystick to suit the task in hand. Thus in some cases, the operator may wish to use the joystick to control the rear hitch while in others it may be used to control the front EHRs. It is possible, under program control, to provide further screens (not shown) to permit the setting not only of the functions controlled by movement of the joystick in the X and Y direction but also its sensitivity and the action performed by depression of the joystick or activating a button set into the head of the joystick. In such screen, the optional settings permitted by the program will be displayed as icons selectable in the same manner as previously described while controls such as sensitivity can be set by moving a pointer along a scale.

Selection of the Profile icon from the Parliament menu (FIG. 11) allows the operator to access the screens shown in FIG. 55 to 58. For each operator and each implement, it is possible to save the current settings of the various operating parameters for use on a later occasion. The purpose of the Profile menu is to allow the operator to save current settings or to restore the setting to factory defaults.

Selection of one of the VT icons (see FIG. 59) changes the function of the display to a VT terminal for the selected piece of ancillary equipment and thereafter the information displayed will be specified by the equipment driving the VT display. The operator may however rapidly switch between the VT and CD displays using the same input device and while viewing the same screen, making the tractor and its ancillary equipment function as a single integrated unit despite the fact that may have been produced by different manufacturers.

The invention claimed is:

1. An agricultural vehicle comprising:
a plurality of controlled agricultural implements;
a programmable computer having input devices configured to receive data and instructions from an operator of the vehicle, said computer connected to send control signals to the agricultural implements;
a display screen connected to the computer to display information regarding the operation of the vehicle and the agricultural implements; and
wherein the computer comprises a memory having storage locations for default settings of the agricultural implements and computerized notebooks containing recorded prevailing values of the settings of the agricultural implements, and the computer is programmed to enable an operator to record prevailing values in a personal notebook and to retrieve said values from the personal notebook for commanding the agricultural implements to replicate the stored settings, said storage locations for default settings being accessible by all operators and each of said personal notebooks being accessible separately by an individual operator.

2. An agricultural vehicle as claimed in claim 1, wherein the default settings are permanently entered into the memory at manufacture.

3. An agricultural vehicle as claimed in claim 1, wherein the computer is programmed to allow authorized operators to overwrite the default settings.

4. An agricultural vehicle as claimed in claim 1, wherein the agricultural implement is a hitch.

5. An agricultural vehicle as claimed in claim 4, wherein the prevailing values and settings correspond to the height of the hitch and enablement and disablement of an automatic power take-off.

6. An agricultural vehicle as claimed in claim 1, wherein the computer can record and save multiple entries for each operator of current prevailing values of the settings of the agricultural implements corresponding to different operating conditions.

* * * * *